Dec. 20, 1938. J. W. WHITE 2,140,778
HYDRAULIC BRAKE
Original Filed March 27, 1933 5 Sheets-Sheet 2

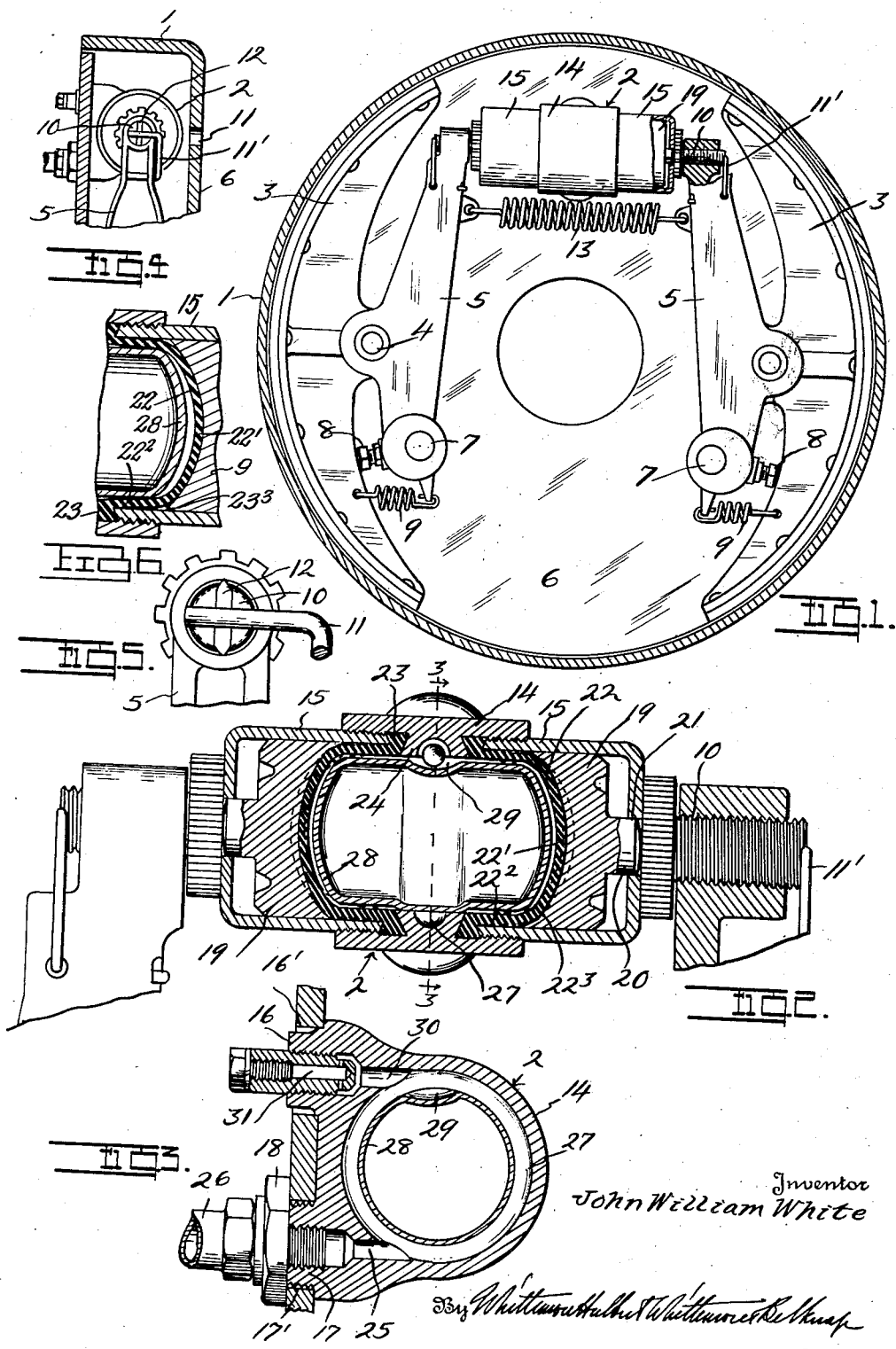

Inventor
John William White

By Blackmore, Spencer & Flint
Attorneys

Dec. 20, 1938.  J. W. WHITE  2,140,778
HYDRAULIC BRAKE
Original Filed March 27, 1933   5 Sheets-Sheet 3

Inventor
John William White

By Blackmore, Spencer & Flint
Attorneys

Dec. 20, 1938.    J. W. WHITE    2,140,778
HYDRAULIC BRAKE
Original Filed March 27, 1933    5 Sheets-Sheet 4

Inventor
John William White

By Blackmore, Spencer & Flint
Attorneys

Patented Dec. 20, 1938

2,140,778

UNITED STATES PATENT OFFICE 2,140,778

HYDRAULIC BRAKE

John William White, South Bend, Ind., assignor to Bendix Products Corporation, South Bend, Ind., a corporation of Indiana Continuation of applications Serial No. 663,085, March 27, 1933, and Serial No. 54,418, December 14, 1935. This application July 24, 1937, Serial No. 155,560

20 Claims. (Cl. 188—152)

This invention relates to improvements in hydraulic brake systems and has particular reference to the hydraulic unit for directly actuating the brakes and sealing means therefor. The present application is a continuation in part of my prior application Serial No. 317,933 filed November 8, 1928, which has subsequently become Patent No. 1,939,584, and a continuation of my prior applications Serial Nos. 663,085 and 54,418 which have since been abandoned in favor of this application.

The invention is concerned with a cup of rubber or the like so associated with the relatively movable parts of the wheel cylinder (the cylinder and piston) as to effectively seal the system and prevent the escape of the contained fluid and the entrance thereto of air. Such an assembly of rubber cup with the wheel cylinder elements is shown in my prior Patent No. 1,939,584 of December 12, 1933, and this invention may be described as an improvement in the rubber cup of that patent.

Among the major objects of the invention is the provision of such a cup which shall have longer life, and one wherein tearing and scuffing shall be reduced to a minimum.

More specific objects directed to the attainment of the said major objects are the provision of a cup having a cylindrical side wall and a dome shaped head of substantially oblate spheroidal form; the provision of a cup so proportioned and positioned with relation to the wheel cylinder and pistons that it is under initial compression when the brake is in released position; and the provision of a cup having a wall of such dimension that it shall not collapse under the sub-atmospheric pressure condition which occurs after the release of the brake actuating pedal; the provision of a tapered side wall whereby the internal pressure is effective to overcome the friction between the outer side wall of the cup and the cylinder wall; an improved dimensioning of the corner, the portion at the junction of the side wall and the dome-shaped head; and an improvement in the dimensioning of the head dependent upon the size of the cup.

The above and other objects and desirable particular arrangements will be apparent upon reference to the following detailed description of several illustrative embodiments of my invention shown in the accompanying drawings, in which:

Figure 1 is a sectional elevation of an internal brake mechanism to which a unit showing an embodiment of my invention is applied;

Figure 2 is an enlarged longitudinal section through the unit and associated parts;

Figure 3 is a cross section on the line 3—3 of Figure 2;

Figure 4 is an end elevation showing the manner of securing the adjusting means in position;

Figure 5 is an enlarged view of a portion of Figure 4.

Figure 6 is a view similar to a portion of Figure 2 showing the position of parts indicated by dotted lines in the latter figure;

Figure 7:
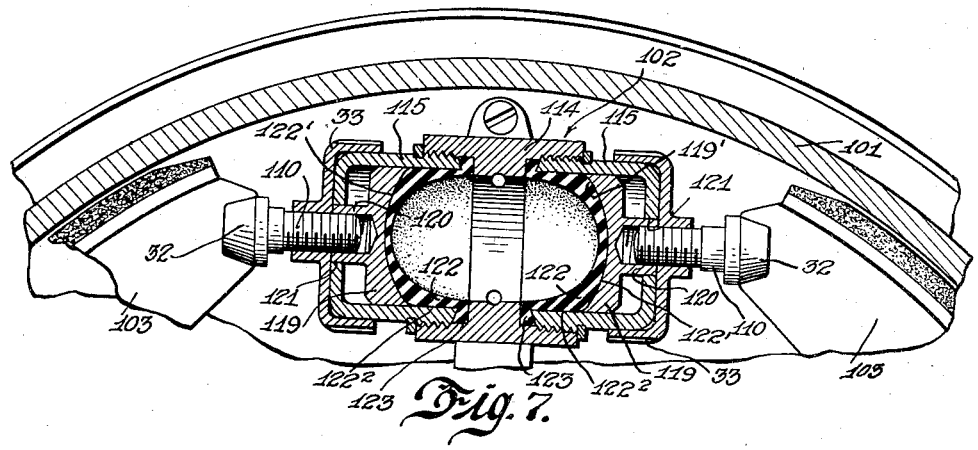
Figure 7 is a view similar to Figure 2, showing an improved modification of my novel sealing cups.

While certain features of my invention are, as above stated, applicable to various constructions of brakes, I have specifically illustrated an internal brake in which 1 is the brake drum of the usual type adapted to be secured to a vehicle wheel and 2 is the brake cylinder inclosed within the brake drum and adapted to act upon the brake shoes 3 forming part of the brake friction means to force them radially outwardly into contact with the brake flange of the brake drum. The brake shoes 3 are pivotally connected at 4 to the brake levers 5, which are pivotally mounted upon the brake carrier or head 6 by the studs 7, which are fixed to the carrier or head. Each brake lever and its associated brake shoe are normally held in a relative angular position, as determined by the set screw 8, by means of the coil spring 9 which is connected to the lower end of the brake lever and the adjacent portion of the brake shoe.

Mounted in the upper end of each of the brake levers 5 is the adjusting screw 10 having its shank threadedly engaging the lever and its head provided with a knurled periphery to facilitate rotating the screw in order to adjust it in relation to the brake lever, an opening 11 being provided through which a suitable tool, such as a screw driver, can be introduced from outside the drum in order to engage the knurled periphery and rotate the screw in the desired direction. Each screw 10 is normally held in its adjusted position by the heavy spring wire 11 which is mounted upon the associated brake lever and engages the notches 12 formed in the outer end of the screw, as shown more particularly in Figures 1, 4 and 5. The brake levers and the brake shoes which together form the brake friction means are normally yieldably held in their retracted positions by the coil spring 13 which extends between and is connected to the upper portions of the brake levers and which exerts an effort through the brake levers tending to move the upper ends of the shoes toward each other. The normal or retracted positions of the brake levers and therefore the brake friction means are determined by the screw 10 contacting with the ends of the brake cylinder 2, as shown more particularly in Figure 2.

Each brake cylinder 2 comprises the central annular housing member 14 and the pair of cup-shaped cylinder members 15 having their open ends extending within and threadedly engaging the central member. The central member 14, as shown particularly in Figure 3, is formed with the upper and lower substantially parallel lugs or projections 16 and 17 which pass through the suitably located holes 16' and 17' in the brake carrier or head 6, so that they act as dowels to locate the brake cylinder. The brake cylinder is secured in place upon the brake carrier or head by means of the nut 18 which encircles and threadedly engages the lug 17 and clamps the central member against the brake carrier or head. The central member and the cylinder members together define a compartment which incloses and serves to limit the movement of the working elements of the brake cylinder described hereinbelow.

These working elements will now be described. Mounted to reciprocate within the compartment are the pistons 19, each of which slidably engages and is guided by its associated cylinder member and is provided at its outer end with the central opening axially extending finger 20 which projects through the central opening 21 formed in the outer end or bottom of the associated cup-shaped cylinder member and which is adapted to engage the adjacent screw 10 and serve to transmit the outward thrust of the piston to the brake lever carrying the screw and the associated brake shoe. The fingers slidably engage and are guided by the walls of the openings and therefore these fingers, in addition to forming second guides for the pistons, act as seals to prevent the entry of dirt, dust, grit, or other material, into the compartment. Also within the compartment and bearing against the inner faces of the pistons 19 are the pair of flexible cups 22 which are preferably formed of rubber. Each of these cups is provided with the annular wedge-shaped bead 23 at its mouth or open inner end and this bead is clamped between the inwardly extending annular flange 24 of wedge-shaped cross section, which is formed on the central member 14, and the associated cylinder member 15, the shoulders formed upon the flange and cylinder member being tapered to correspond with the shoulders formed upon the bead. The construction is such that the central member and the cylinder members act to hermetically seal the cups. It will be further noted that the application of fluid pressure to the walls of the cups, as described later, tends to increase the clamping of the beads and, in the event that the seal is not absolutely perfect, makes it so, and in this respect the cups are self-sealing.

The lug or projection 17 is formed with the inlet passage 25 and is adapted to be connected to the fluid supply conduit 26. The annular flange 24 is formed with the internal annular groove 27 into which the inlet passage 25 leads. The cups 22 being, as previously pointed out, firmly anchored in the compartment at their peripheries, define with the annular flange 24 a hermetically sealed chamber or sack having movable end walls. In order to reduce the amount of fluid necessary to fill this chamber or sack, the filler 28, which is preferably made of pressed steel, may be introduced, this filler preferably having an intermediate portion firmly engaging the flange 24. The filler is provided at its top with the depression 29 which connects with the groove 27 and this facilitates the filling of the chamber or sack around the filler. The lug or projection 16 is provided with the bleed passage 30 which leads to the groove 27 and this passage is normally closed by the valve 31 which is opened when necessary to permit the escape of air and insure the complete filling of the chamber or sack with the hydraulic fluid.

It will be noted that with the construction above described, the brake cylinder 2 forms a unit which is rigidly mounted upon the brake carrier or head 6 and that the outer ends of the cupped cylinder members 15 form stops for limiting the retractile movement of the brake friction means. It will also be noted that the outer ends of the cupped cylinder members form stops for limiting the outward movement of the pistons 19 and consequently the flexible cups 22 and in this connection this outward movement is limited to be well within the elastic limit of the cups.

The construction of the brake cylinder, as above described, provides for conveniently attaching the brake cylinder to the brake carrier or head and the fact that the fluid inlet passage is through one of the lugs or projections of the brake cylinder simplifies connection with the supply conduit, which is external to the brake drum. Also the bleed controlling valve being located outside the brake drum may be readily opened or closed.

An important feature of the construction is that of forming the flexible cups 22 and pistons 19 to secure efficient operating cups of long life. These cups have their domes formed with the central portions 22' normally on a radius greater than that of their cylindrical side walls $22^2$ and with the corner portions $22^3$ normally on a radius smaller than that of the central portions, so that the domes are relatively low and inherently well supported being approximately of oblate spheroidal form. These pistons have their inner faces concave in form to substantially correspond to the form of the outer faces of the domes and the lips or corners of the pistons are preferably rounded away from the flexible cups, the arrangement being such that the domes of the flexible cups will exactly conform to the pistons and the side walls of the flexible cups will exactly conform to the side walls of the cylinder members 15 when the pistons are either in their normal or retracted positions or their fully extended positions without subjecting the flexible cups to objectionable localized stresses or cutting at any points.

The construction is also such that during operation the flexible cups are subjected to a uniform stretch and scuffing or abrasion of their outer surfaces is reduced to a great extent. With the parts in their normal or retracted positions when the hydraulic fluid under pressure is introduced through the conduit 26 the central portions 22' of the cup domes are forced outwardly and the pistons 19 are moved outwardly therewith, since the domes are not hemi-spherical and the pressure of the hydraulic fluid tends to make them so. As a result, during this outward movement of the central portion 22' the corner portions 22³ and the side walls 22² are drawn in to clear the adjacent portions of the pistons 19 and the side walls of the cylinder members 15 respectively, as shown by the dotted lines in Figure 2, by reason of the contractile effort exerted by the central portions 22'. Thus, while the pistons 19 are being moved outwardly the flexible cups are allowed to stretch freely without retardation by side walls or corner pressure. Finally, when further outward movement of the pistons 19 is resisted to such an extent by contact of the brake friction means with the brake flange of the drum the flexible cups are subjected to a predetermined fluid pressure due to this resistance, which causes the corner portions 22³ and the side walls 22² to be laid down gradually upon the surfaces of the pistons and cylinder members. Thus it will be seen that scuffing or abrasion of the outer surfaces of the flexible cups is largely avoided, any further brake application involving such a small movement of the pistons and flexible cups that injurious effect upon the cups is negligible.

From the above, it will be seen that the brake friction means is applied to the brake drum by the domes of the flexible cups earlier with less fluid displacement than in an actuator of the sliding piston type and the stretching out period provides a resiliency of application comparable to a cushioning effect which gives a much better pedal feel than that obtained with an actuator of the sliding piston type. Also, as the flexible cups stretch, their walls thin out so that the ratio of reduction is greater as the stroke increases, which produces a valuable effect. For example, the application of a hydraulic brake being a direct ratio of the pressure applied, the braking effect with light pedal pressures is often too great to cure this trouble it has been common practice to use heavy springs on the pedals and the brake friction means to load the same at light pressures. This causes loss of effort, whereas the increasing ratio supplies this retarding effect without waste energy.

On return movement of the parts to their normal or retracted positions, the reverse operation takes place, so that scuffing or abrasion of the outer surfaces of the flexible cups is also avoided.

Another important feature is that of so proportioning the parts that the elastic sealing cups 22 are under compression in the normal or retracted positions of the pistons 19, so that perfect fit between the domes of the cups and the pistons is assured, thereby eliminating air space and saving lost motion. This is possible by reason of the well supported shapes of the domes and also by reason of forming the cups with the proper thickness and hardness of rubber. In this connection, I have found that a thickness of $\frac{3}{32}$ of an inch of rubber for the side walls and domes is satisfactory and that a hardness of from 60 to 80 and preferably of from 70 to 80, as measured by a durometer, is also satisfactory.

To facilitate frictionless movement of the flexible cups, I provide dry lubricant in the nature of powdered or flaked graphite or mica along the outer surfaces of the cups, this dry lubricant attaching itself to both the rubber forming the cups and the metal forming the cylinder members and the pistons.

With various sizes of cups or lengths of strokes, it is advantageous to vary the thicknesses of the side walls and the domes of the cups to secure the above operation and consequently I have illustrated several improved embodiments of my novel cups in Figures 7–12 inclusive which I will now describe. Parts in Figures 7–12 inclusive corresponding in function to parts in Figures 1–6 inclusive are hereafter designated by the same reference numeral plus one hundred.

Referring now to the Figures 7–12 inclusive, in which parts corresponding to parts in Figures 1–6 are designated by the same reference numerals 114, 115 and 115 represent a wheel cylinder, the parts 115 being threaded into the part 114 and securing the annular flanges 123 of rubber cups 122 therebetween. The cups have side walls 122² terminating in dome-shaped ends 122'. The side walls lie adjacent the inner walls of parts 115—115 and the domes 122' fit concave surfaces 119' of pistons 119 mounted to slide within the parts 115. These pistons have reduced ends 120 projecting through openings 121 in the otherwise closed ends of parts 115. The reduced ends 120 are bored to receive freely the screw member 110, the outer ends of which engage the brake shoes 103 in relatively non-rotatable relation as shown in fragmentary fashion at 32—32. Adjusting nuts 33 are threaded on the screws. These nuts are intended to engage the ends of parts 115 and to thereby determine the release limit of the shoe. They also are engaged by the piston ends 120. When the pistons are moved outwardly by the expansion of the rubber cups under the influence of fluid being forced therein, the piston ends 120 push outwardly upon the nuts which through the screws expand the shoes into drum contact. By rotating one of these nuts the screw is moved axially and the shoe clearance is varied, since the screw is held from rotation by its engagement with the shoe.

In my foregoing description of Figures 1 to 5, I have explained the advantages to be gained in the life of the cup if the external radius of the dome is greater than the radius of the side wall and if the external radius of the cup at the junction of the side wall and dome is less than the side wall radius. Experience has shown the desirability of these characteristics and they are retained in my still further improved cup about to be described, which cup is characterized also by added features.

In the first place it has become evident that not only are the best results secured if the radii are as stated, but that the thickness of the cup both at the side and at the dome-shaped head is a matter of importance. Upon brake release, the piston of the master cylinder may withdraw faster than the wheel cylinder pistons return to their release position. This tends to create some degree of sub-atmospheric pressure in the system. If the walls of the rubber are not thick enough to resist the pressure change they may collapse and be withdrawn from contact with the metallic walls. A clearance is thus created which must be taken up at the beginning of the next forward stroke of the pedal and master piston. There results an unduly long pedal travel to secure brake application. To remedy such an operation, the walls both on the side and in the dome should be sufficiently thick to resist collapse under such suction condition as may occur. It has been found that the difficulty is overcome if the walls are resistant to three pounds of vacuum, the actual thickness to so resist vacuum being obviously dependent upon the characteristics of the rubber. It may be of interest to note from Fig. 10 that cups A and B, two of the earlier built cups, were of thin section walls and that those walls did collapse under sub-atmospheric pressure. Cup C, however, did not collapse owing to its shorter side walls and the strength at the corner. This cup embodied the idea outlined in my abandoned application Serial Number 663,085, of which this is a continuation.

It should be further noted that when the pistons 119 returned they slightly compress the rubber cup, so that in action the rubber goes back and forth from a state of compression through a neutral stage to a stage of expansion. In being compressed it has been found that there is a tendency for the cup to bulge inwardly at the center of the dome unless the cup wall is of sufficient thickness to prevent such action. The length of the cup when unstressed is sufficient to hold the piston slightly protruded from the cylinder head. The retracting springs bring it back flush with the cylinder wall and in doing so give a slight compression to the rubber which is made sufficiently stiff to avoid collapse under such compression. This construction serves to increase the possible length of stroke without damage to the rubber.

The stretching of the rubber axially and the friction between the rubber wall and the adjacent metal wall has been carefully considered. A change has been made from the earlier cup designs which is effective in producing longer life. The change consists in modifying the side wall by forming it with a gradually increasing thickness from the region adjacent the securing flange toward the dome-shaped head. This change has been made in a cup having the outside surfaces of the side wall, dome-shaped head and corner as set forth with relation to Figures 1–6. The "life" tests have proved conclusively the desirability of the change.

The reasons for the longer life I believe may be explained as follows: The side wall is stretched by the pressure acting on the head, pulled axially. The side wall may be considered as a plurality of annular bands marked 1, 2 and 3 in Fig. 9. If the bands were of uniform thickness and if there were no friction, the axial stretching of each band would be the same. Since, however, each band is subject to the same increment of axial extension from its condition of rest, the band 2 will not only be subject to an increase of length of $a$ but will move a length $a$ because of the stretch of band 1. Similarly band 3 will be subject to a stretch in length of $a$ and, in addition thereto, to a movement $2a$ along the wall because of the stretch in bands 1 and 2. The uniform pressure acting on the side wall causes a frictional force between the outer side wall and the cylinder wall and since there is a greater movement for each successive band there is necessary a greater axial force to compensate the greater frictional drag. By tapering the inner surface from the region near the cup flange so that its thickness increases toward the dome, the radial pressure meets the tapering surface whereby the force is given an axial component increasing as the distance increases from the fastening means to the dome. This increasing axial component is sufficient to provide for the additional frictional drag resulting from the greater axial sliding of the successive bands along the cylinder wall.

The condition of the rubber at the corner, the junction of the head and side wall has been given careful attention. For best results the stretching should be confined to the side wall and not to the head or corner. In the earlier forms when liquid pressure was applied, the center of the dome of the rubber cup followed the piston tending to pull the corner region and the adjacent end of the side wall away from the cylinder. Additional pressure, after the shoes were brought into contact with the drum, resulted in but little more piston movement. These higher pressures increased the side wall friction and resisted side wall stretching. The cup gradually lay back against the cylinder wall and ultimately a local stretch occured at the corner. In these early types where the cup section was of uniform thickness the head portion itself stretched so that a part of the dome proper shifted to engage the cylinder wall. This shifting was evidenced by a scuffing through of the rubber on the head in a region quite near the side wall. The thickening of the head and corner has been found to be the solution of the difficulty. This change in the head and corner goes along very nicely with the tapering of the side wall as will be obvious from an inspection of the drawings. When the head is thickened its tendency to stretch is overcome. The thickening of the corner provides more material at the region where scuffing might occur and it prevents the part of the head adjacent the side wall from turning the corner and becoming a part of the side wall. This thickening of the corner gives it a longer radius on the inside. When the inside radius was short there was a tendency for a rip to develop just opposite the region of scuffing on the outside.

The thickening of the corner in the manner shown, which gives its inner wall a long radius and a form having no abrupt change of thickness, is an aid in preventing a localized inside stress. This is of importance because necessarily the inside area is much less than the outside area and therefore the tension or stress under movement is greater. It should also be noted that friction between the liquid and the inner wall is negligible while the friction between the outer wall and the cylinder is considerable, due to high pressure and stretching. The inside and outside walls tend, therefore, to have a relative axial movement when the fluid pressure is applied. A large corner radius and a gradually changing thickness lessen the harm which may result from this effect.

Figure 8:
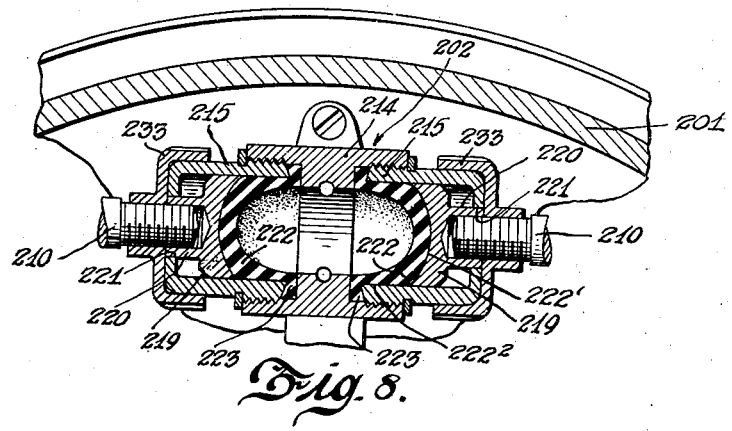
Figure 8 is a view similar to Figure 7 of a cup assembly of smaller size than that shown in Figure 7.
Figure 9:
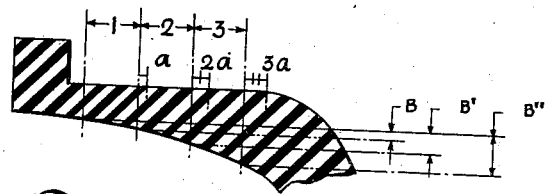
Figure 9 is a diagrammatic view.

It should be remembered that the pressure applied to the head should stretch the side wall and do so without any shifting of the head to the side wall; and also that the prevention of such shifting is accomplished by a thickening of the head and corner sections. Since the area of the side wall varies directly with the radius and since the area of the head varies as the square of its radius, it will be seen that for smaller cup sizes a disproportionately thick dome region is necessary and that for large diameter cups the total pressure, because of large head area, is sufficient to stretch the side walls when the pressure per unit of area is sufficiently low to avoid the danger of shifting from head to side. For this reason the smaller diameter cups are provided with a relatively thick head, as well as a thick corner. This is illustrated in Figure 8 where the smaller cup 222 is shown with a thicker bend than cup 122 in Figure 7. In the larger sizes the corner should be thick for the reasons stated but, without adverse effects to the operation, the central region of the head may be made thinner. In fact it is advantageous to make this region thinner because this results in an increased inside area and thus reduces the unit area stretch and prevents localized stretching.

Cups made in accordance with the above inventive concepts have been found to have very much longer life than the cups of the prior art and of my own earlier design. The essential characteristics include the tapering of the side walls, the thickening of the head and corner and the relatively thinner head in the case of the larger diameter cups. These several characteristics are accomplished by modifying the inside of the cup, i. e. the changes in thickness are made by changing the inside wall, the outside having the short radius corner and the long radius head as heretofore described.

Figure 10:
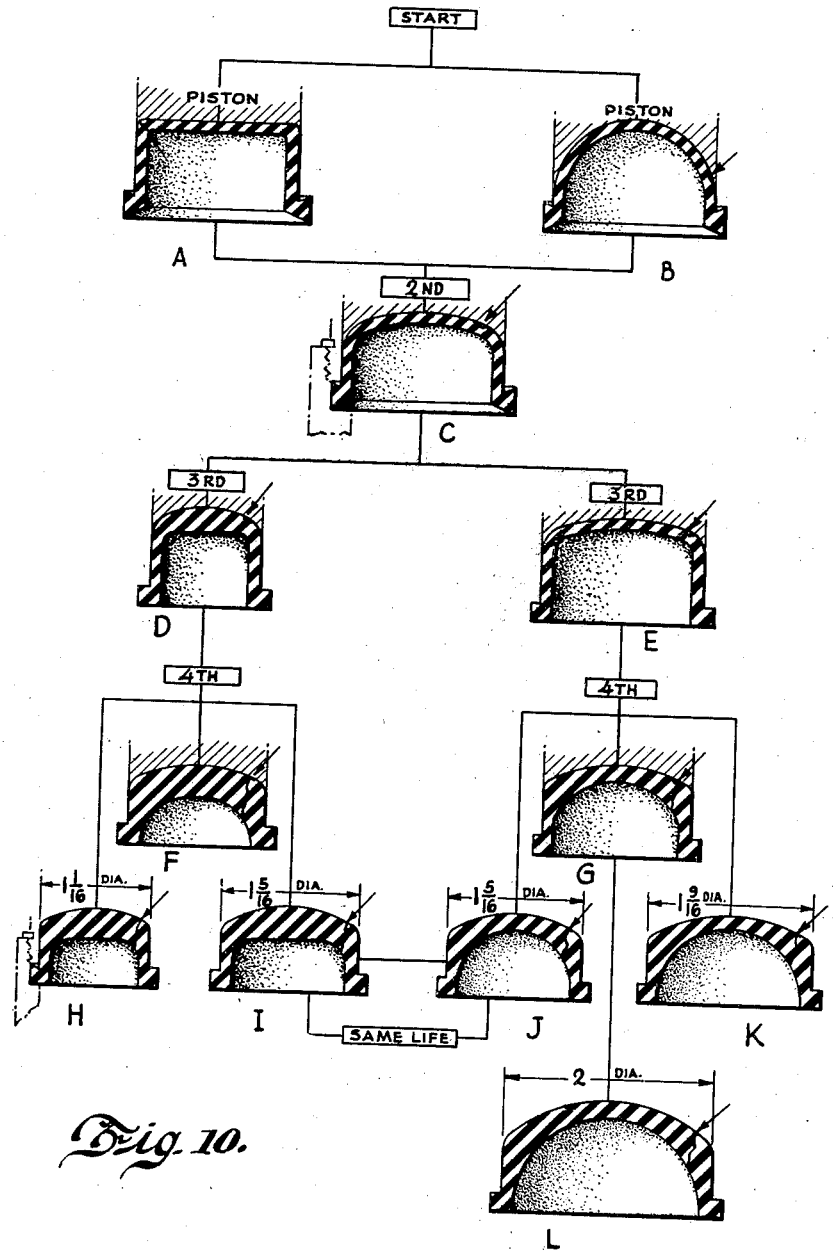
Figure 10 is a diagram showing the development of the cup and the variations for different sizes.

As illustrative of the development of the invention, Fig. 10 shows at A and B two of the first cups. Each has a uniform wall throughout; one has a bad right angular corner marked by an arrow where a rip tended to occur. Also, this corner region tended to "freeze" and become locked to the wall, apparently for the reason that there was not sufficient endwise pull to overcome the sliding friction. This cup was of insufficient thickness and tended to collapse under the subatmospheric pressure. The cup marked B employed a spherical shaped dome. It, too, tended to collapse. This shape of head was associated with a thin edge piston which tended to cut the rubber.

Cup C, the cup illustrated in the embodiment of Figures 1-6 was a development from cups A and B and is characterized principally by the novel outside contour. The head is of dome-shape whereby the axial length of the cup is reduced and the sharp edged piston avoided. The advantages of the relatively long external radius of the head and the relatively short external radius of the corner as compared with the side wall radius are incorporated at this stage of the development. This form gave much longer life than either of the others which preceded it. In life tests it failed at the point marked by the arrow where scuffing occurred.

As the next step, a change was made between the larger and smaller cups because of the relation between the head area and the side wall area in the case of the two kinds of cups. In a small cup D the head was made thicker than that of a large cup E and this was done by a change in the inside of the cup. This was found necessary in the case of the small cup to get the length of life of the larger cup C. In both these forms the region adjacent the head and wall finally scuffed through. The corner was then thickened in both the smaller and larger cups to make the cups marked F and G. These cups F and G also show the tapered side walls. In cup F the head and corner are both thickened and in cup G—the large cup—the thickening is in the corner region only, the absence of any need for full head thickening being recognized.

The cups marked H and I are of two sizes, $1\frac{7}{8}$ diameter and $1\frac{5}{8}$ diameter. These cups embody the characteristics of cup F including the fully thickened head. Cups J and K embody the principles of cup G where the center part of the head is reduced in thickness. The tests show that for the larger sizes it is better to form the head as shown, but that for the somewhat smaller $1\frac{5}{8}$ diameter cups it is substantially immaterial whether or not the head is reduced in thickness. For maximum diameter cups like number L, best results require the reduction of head thickness as shown.

The explanation of the discovery set forth in the paragraph above may be due to the relation of the side wall and head areas. In a cup having the head area substantially the same as the side wall area the reduction in thickness at the center of the head seems not to affect materially the life of the cup. Progressively smaller diameter cups require progressively thicker heads, so that the necessarily greater unit pressure, in the case of the smaller cups, may not crowd the head over upon the side wall. Progressively larger diameter cups permit reduction in the thickness of the head and such reduction is desirable as explained above. The area of reduction in thickness may well be circular in outline with its center at the center of the head and its radius such as to effect a region of reduced thickness equal to the excess of the side wall area over the total head area.

Figure 12:
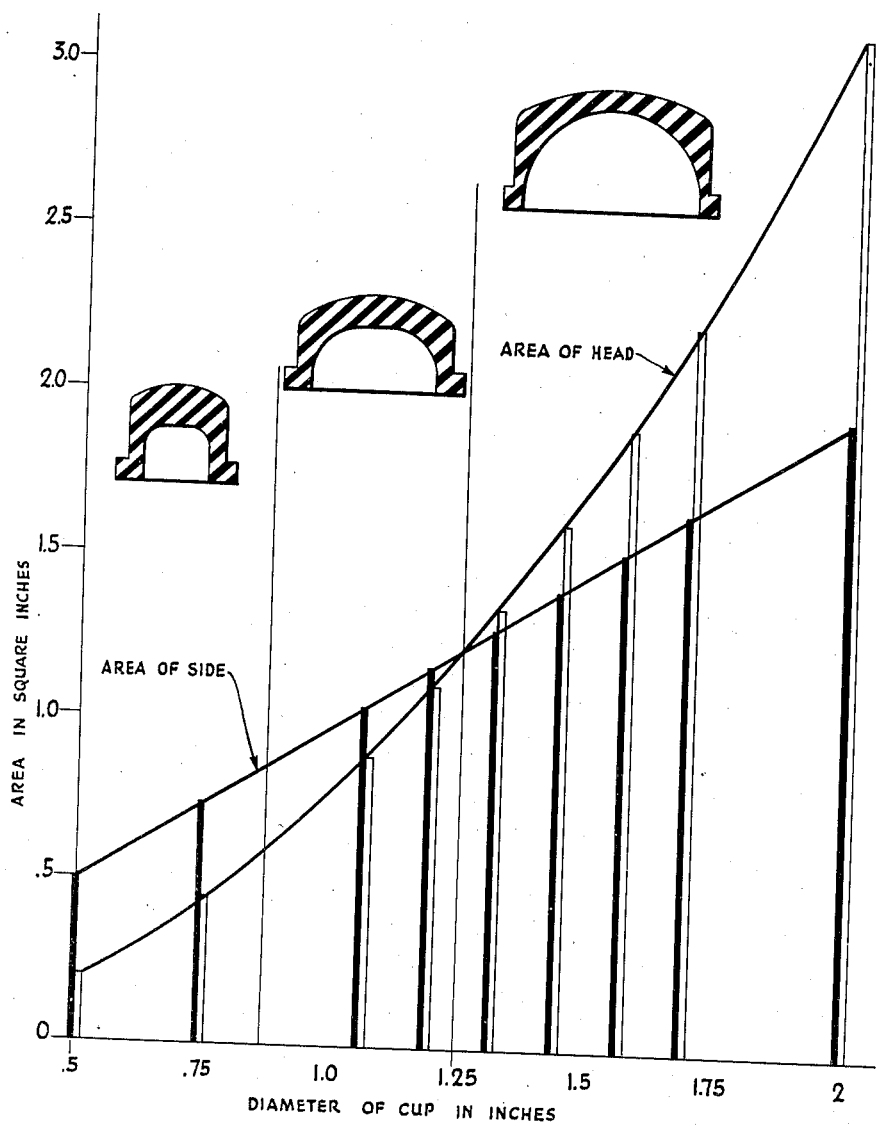
Figure 12 is still another diagram.

Fig. 12 is intended to illustrate these cup characteristics. It is intended to show that where the side wall area is substantially the same as the head area there need be no material difference between the side wall thickness and head thickness. This is shown on the diagram as applying to a cup having a diameter of about 1.25 inches. In the case of progressively smaller diameter cups, the head area decreases at a rate greater than the side area and for this reason thicker heads are needed. In progressively larger diameter cups the head area increases faster than the side wall area, so that the central region of the head may be advantageously reduced in thickness.

Figure 11:
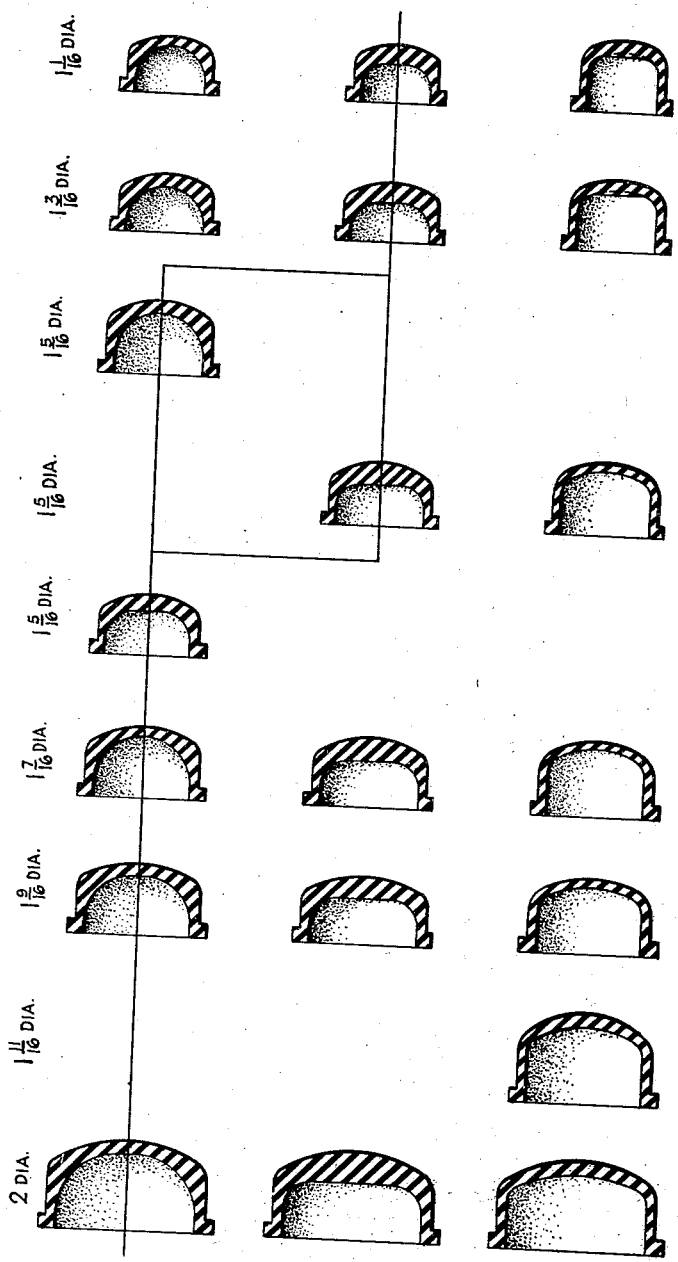
Figure 11 is another diagram.

The diagram shown by Fig. 11 shows a plurality of cups of different shapes for each of several diameters. The cups giving the best life tests are indicated by a heavy line. From this diagram, too, it will be seen that in the case of the intermediate sizes such as $1\frac{5}{8}$ substantially the same long life is obtained whether or not the reduced thickness of the center of the head is employed.

While several embodiments of my invention have been described in detail, it is not my intention to be limited to those embodiments or otherwise than by the terms of the appended claims.

I claim:

1. An hydraulic unit for actuating a brake mechanism including a hollow member provided with an annular shoulder therein, a cupped cylinder member having its open end externally threaded to engage corresponding internal threads in said hollow member, a flexible cup having a cylindrical portion, a dome-shaped end portion and a flange at the opposite end, clamped between said cupped cylinder member and said annular shoulder, a piston within said cupped cylinder having a concave face fashioned to conform to the external surface of said flexible cup and a finger projecting from said piston out through an aperture in the end of said cupped cylinder into operative engagement with said brake mechanism.

2. An hydraulic unit comprising a cylinder provided with an hydraulic connection thereto, a piston in said cylinder and sealing means between said cylinder and piston comprising a resilient elastic cup having a peripheral flange engaging an annular groove in said cylinder and said cup also having a cylindrical portion lying adjacent to the wall of said cylinder and an end portion approximately of an oblate spheroidal form engaging a correspondingly shaped recess in said piston, the walls of said cup being of such resistance relative to the hydraulic pressure that during initial movement they will be withdrawn from frictional contact with a portion of the cylinder walls permitting of uniform stretching throughout the free length thereof.

3. An hydraulic unit for actuating brake mechanisms comprising a cylinder having an hydraulic connection therewith, a piston in said cylinder and sealing means between said cylinder and piston comprising a resilient rubber cup having a peripheral flange clamped in a groove in the cylinder wall, said cup also having a cylindrical portion lying adjacent to the cylindrical wall and an end portion approximately of an oblate spheroidal form engaging a correspondingly shaped recess in the end of the piston, the walls of said rubber cup being of such resistance relative to the hydraulic pressure that during initial movement they will be withdrawn from frictional contact with a portion of the cylinder walls to uniformly distribute the elongation throughout the free length thereof and during the final brake applying pressure will be forced into conformity to the cylinder walls.

4. An hydraulic unit for actuating a brake mechanism comprising a cylinder member provided with an hydraulic connection thereto, a resilient flexible cup having a cylindrical side wall portion normally fitting within said cylinder and clamped thereto at one end, the opposite end being a dome of a non-hemispherical shape and such as to be deformed by internal fluid pressure to withdraw the adjacent portions of the side wall from frictional contact with the cylinder wall, and a piston actuated by said cup conforming to the normal shape of said dome.

5. An hydraulic unit for actuating a brake mechanism comprising a cylinder member provided with an hydraulic connection thereto, a resilient flexible cup having a cylindrical side wall portion normally fitting within said cylinder and clamped thereto at one end, the opposite end being a dome of a radius greater than the radius of the cylindrical side wall portion, and a piston conforming to the normal shape of said dome.

6. An hydraulic unit for actuating a brake mechanism comprising a cylinder member provided with an hydraulic connection thereto, a resilient flexible cup having a cylindrical side wall portion normally fitting within said cylinder and clamped thereto at one end, the opposite end being a dome with its central portion of a radius greater than the radius of the cylindrical side wall portion and connected thereto by a curved portion of a radius less than that of said side wall portion, and a piston conforming to the normal shape of said dome.

7. The combination with brake friction means and means for normally retracting the same, of an hydraulic unit for applying said brake friction means comprising a cup-shaped cylinder having an hydraulic connection thereto, a piston within said cylinder operatively connected to said brake friction means and having a concave inner-face and a flexible cup having a cylindrical side wall portion fitting within said cylinder and clamped thereto at one end, the opposite end being of dome shape fitting the concave of said piston, the side wall portion of said cup being stressed in one axial direction as the piston is moved to brake applying position by the cup and stressed in the opposite axial direction as the brake friction means restores the piston to the normal release position, said cup-shaped cylinder forming a stop to limit the outward movement of said piston, the inward movement of the brake friction means and the corresponding stresses of said flexible cup.

8. The combination with brake friction means and means for normally retracting the same, of an hydraulic unit for applying said brake friction means comprising a cup-shaped cylinder having an hydraulic connection thereto, a piston within said cylinder operatively connected to said brake friction means and having a concave innerface and a flexible cup having a cylindrical side wall portion fitting within said cylinder and clamped thereto at one end, the opposite end being of dome shape, said cup in the retracted position of said brake friction means being normally compressed by said piston to be contracted in length and closely fit the inner-face thereof and the cylinder walls.

9. The combination with brake friction means and means for normally retracting the same, of an hydraulic unit for applying said brake friction means comprising a cupped cylinder member having an hydraulic connection thereto, a piston within said cylinder operatively connected to the said brake friction means and having a concave innerface and a flexible cup having a cylindrical side wall portion within said cylinder and clamped thereto at one end, the opposite end being of dome shape, said cup in the retracted position of said brake friction means being normally compressed by said piston to be contracted in length and closely fit the inner-face thereof and the cylinder walls, said cupped cylinder member forming a stop for limiting movement of said piston the inward movement of the brake friction means and the corresponding stretch and compression of said flexible cup.

10. The combination with brake friction means and means for normally retracting the same of an hydraulic unit for applying said brake friction means comprising a cylinder having an hydraulic connection thereto, a piston within said cylinder operatively connected to said brake friction means and a flexible cup within said cylinder and clamped thereto at its open end, said cup in the retracted position of said brake friction means having the walls thereof internally stressed to alter the normal length thereof whereby a portion of the movement of said piston relieves said stress and restores said normal length and only the remainder of the movement of said piston subjects said cup to reverse stress.

11. In combination with a cylinder, a piston movably mounted therein, an expansible cup having a dome engaging said piston, a side wall adjacent said cylinder and a peripheral margin secured from movement relative to the cylinder, said cup having its side wall progressively thickened from the region of its peripheral margin toward its head.

12. For use with a cylinder and piston, sealing means for said piston comprising an extensible cup having a side wall of progressively increasing thickness toward the junction of the side wall and the bottom of the cup.

13. For use with a cylinder and piston, sealing means therebetween comprising an extensible cup, said cup having a side wall and a bottom closure, said side wall being progressively thickened toward the junction of the side wall and the bottom closure and said junction being thickened to avoid scuffing.

14. For use with a cylinder and piston, sealing means therebetween comprising an extensible cup, said cup having a side wall and a bottom closure, said side wall being progressively thickened toward the junction of the side wall and the bottom closure and said junction being thickened to avoid scuffing, the bottom closure being similarly thickened.

15. An extensible cup for sealing a piston, said cup having a cylindrical side wall and a spherical bottom closure, a corner therebetween, the external radius of the corner being less than the cylindrical side wall radius and the external radius of the spherical bottom closure being greater than the side wall radius, the thickness of the side wall progressively increasing toward the corner.

16. The invention defined by claim 15, the thickening of the side wall extending at least around the corner into the head.

17. The invention defined by claim 15, the thickening of the side wall extending at least around the corner into the head and the thickness of the center portion of the head being reduced to increase the area of the internal surface.

18. For use with a cylinder and piston, an extensible sealing cup having a dome formed with a spherical external surface and a cylindrical side wall and having the radius of the external spherical dome greater than the radius of the cylindrical side wall and having the radius of the external surface at the junction between the side wall and the dome less than the radius of the side wall, characterized further in that corners at the junction between the side wall and the dome are thicker than the side wall and the head.

19. For use with a cylinder and piston, an extensible sealing cup having a dome formed with a spherical external surface and a cylindrical side wall and having the radius of the external spherical dome greater than the radius of the cylindrical side wall and having the radius of the external surface at the junction between the side wall and the dome less than the radius of the side wall, characterized further in that the thickness of the side wall gradually increases toward the dome shaped head.

20. For use with a cylinder and piston, an extensible sealing cup having a dome formed with a spherical external surface and a cylindrical side wall and having the radius of the external spherical dome greater than the radius of the cylindrical side wall and having the radius of the external surface of the junction between the side wall and the dome less than the radius of the side wall, characterized further in that the ratio of the thickness of the head and the thickness of the side wall is roughly proportionate to the ratio of the area of the side wall to the area of the head.

JOHN WILLIAM WHITE.